United States Patent
Im et al.

(10) Patent No.: US 7,890,582 B2
(45) Date of Patent: Feb. 15, 2011

(54) SYSTEM AND METHOD FOR PROVIDING THE REGIONAL COMMUNITY SERVICE BASED ON MOBILE BLOG IN MOBILE TERMINAL

(75) Inventors: Hyuck Jin Im, Seoul (KR); Ji Hoon Kim, Seoul (KR); Kun Yong Park, Seoul (KR); Jung Wook Seo, Seoul (KR); Chester An, Seoul (KR); Yong Il Lee, Seoul (KR); Chol Hong Im, Seoul (KR); Jonathan Kim, Seoul (KR); Ui Chung Chung, Seoul (KR); Youn Kyung Go, Incheon (KR); Hyun Jung Kwon, Seoul (KR); Soo Jin Kim, Gyeonggi-Do (KR); Jae Hong Ahn, Seoul (KR); Don Hi Won, Seoul (KR); Sung Wha Shim, Seoul (KR)

(73) Assignee: SK Communications Corp., Seoul (KR)

( * ) Notice: Subject to any disclaimer, the term of this patent is extended or adjusted under 35 U.S.C. 154(b) by 728 days.

(21) Appl. No.: 11/572,359

(22) PCT Filed: Jul. 19, 2005

(86) PCT No.: PCT/KR2005/002327

§ 371 (c)(1),
(2), (4) Date: Jan. 19, 2007

(87) PCT Pub. No.: WO2006/009383

PCT Pub. Date: Jan. 26, 2006

(65) Prior Publication Data

US 2008/0005251 A1    Jan. 3, 2008

(30) Foreign Application Priority Data

Jul. 20, 2004    (KR) .................... 10-2004-0056210

(51) Int. Cl.
*G06F 15/16* (2006.01)
(52) U.S. Cl. ................. 709/204; 455/414.3; 455/456.1; 340/991
(58) Field of Classification Search ................. 709/201, 709/203, 206, 207, 204; 455/414, 455, 456, 455/457, 566, 41.2, 414.2; 707/102, 758; 715/779; 370/338
See application file for complete search history.

(56) References Cited

U.S. PATENT DOCUMENTS

| | | | | |
|---|---|---|---|---|
| 6,091,956 | A * | 7/2000 | Hollenberg | 455/456.5 |
| 6,452,498 | B2 * | 9/2002 | Stewart | 340/573.1 |
| 6,785,551 | B1 * | 8/2004 | Richard | 455/456.1 |
| 6,798,358 | B2 * | 9/2004 | Joyce et al. | 340/995.24 |

(Continued)

OTHER PUBLICATIONS

Vacca, John R., "The push-talk (r)evolution: carriers are rushing to implement this walkie-talkie-like feature-and piling on new business features in the process", Mar. 1, 2004, Mobile Business Advisor, pp. 1-7.*

*Primary Examiner* — Dustin Nguyen
(74) *Attorney, Agent, or Firm* — Rabin & Berdo, .PC.

(57) ABSTRACT

Disclosed is a system for providing a moblog-based regional community service through a mobile terminal. The system includes a location-based community server for setting a plurality of main arenas by dividing a geographical area in a regional unit, setting and storing one or more virtual spatial locations, the one or more virtual spatial locations being a projection of real spatial public locations, as spots in one of the main arenas, receiving information on posts registered in spots transmitted through a mobile terminal by providing one or more pieces of information on the spots belonging to the main arena from information on a location of the mobile terminal to the mobile terminal, and storing the received information on posts with a link with the spots.

19 Claims, 13 Drawing Sheets

U.S. PATENT DOCUMENTS

| | | | |
|---|---|---|---|
| 7,069,003 B2 * | 6/2006 | Lehikoinen et al. | 455/414.2 |
| 7,336,928 B2 * | 2/2008 | Paalasmaa et al. | 455/41.2 |
| 7,545,784 B2 * | 6/2009 | Mgrdechian et al. | 370/338 |
| 7,707,218 B2 * | 4/2010 | Gocht et al. | 707/758 |
| 2003/0008661 A1 * | 1/2003 | Joyce et al. | 455/456 |
| 2003/0028595 A1 * | 2/2003 | Vogt et al. | 709/204 |
| 2005/0064852 A1 * | 3/2005 | Baldursson | 455/414.2 |
| 2005/0273489 A1 * | 12/2005 | Pecht et al. | 709/203 |
| 2005/0278371 A1 * | 12/2005 | Funk et al. | 707/102 |
| 2006/0010395 A1 * | 1/2006 | Aaltonen | 715/779 |

* cited by examiner

SYSTEM AND METHOD FOR PROVIDING THE REGIONAL COMMUNITY SERVICE BASED ON MOBILE BLOG IN MOBILE TERMINAL

BACKGROUND OF THE INVENTION

1. Technical Field

The present invention relates to a mobile blog system and method for registering and reading bulletins through a mobile terminal, and more particularly, to a system and method for providing moblog-based regional community services through mobile terminals, which is capable of registering bulletins in connection with information on user's location.

2. Description of Prior Art

Earlier wireless Internet services, that is, Internet service using mobile terminals, have provided relatively simple contents such as ring-tone downloading, mobile games and the like. With change of environments such as opening of mobile communication networks, wired/wireless integrated Internet services based on user-based services of Platforms have been facilitated.

In addition, relational wired/wireless services for which wireless networks are linked with wired networks have been developed with increasing speed. For example, services, such as instant messengers, mobile mini homepages, mobile blogs and the like, using mobile terminals have been provided.

On the other hand, the up-to-date term 'moblog', which is a compound word of 'mobile' and 'blog', means a service provided to put contents such as writing, photography and the like in a blog on a web in real time using a mobile terminal.

The current moblog service has been achieved in such a manner that user's photographs or writing are delivered to servers or the users inquire photographs or writing registered in servers of the servers. In the moblog services, although real-time information on photographs and writing at a certain location is transformed and stored, information on the certain location is not inputted or must be separately inputted by a user. Accordingly, this information on the location is difficult to be searched for by persons other than a person in question, which may result in deterioration of value of the moblog service.

Accordingly, there is a keen need for a method of raising a degree of sharing of information on photographs and writing between users in the moblog services and a service method of supporting formation of human networks through formation of real-time communities.

SUMMARY OF THE INVENTION

Therefore, it is an object of the present invention to provide a system and method for providing a moblog-based regional community service through a mobile terminal, which is capable of storing and sharing information related to experience suffered by users on the basis of actual locations or supporting meetings of users having the same concerns on the basis of the user's regions.

It is another object of the present invention to provide a system and method for providing a moblog-based regional community service through a mobile terminal, which is capable of publishing experience suffered by users at their locations in the form of photograph or writing through wired/wireless apparatuses or sharing stored information with other persons.

To achieve the above objects, according to one aspect, the present invention provides a system for providing a moblog-based regional community service through a mobile terminal, including a location-based community server for setting a plurality of main arenas by dividing a geographical area in a regional unit, setting and storing one or more virtual spatial locations, the one or more virtual spatial locations being a projection of real spatial public locations, as spots in one of the main arenas, receiving information on posts registered in spots transmitted through a mobile terminal by providing one or more pieces of information on the spots belonging to the main arena from information on a location of the mobile terminal to the mobile terminal, and storing the received information on posts with a link with the spots.

According to another aspect, the present invention provides a method for providing a moblog-based regional community service through a mobile terminal. The method includes the steps of setting a plurality of main arenas by dividing a geographical area in a regional unit and setting and storing one or more virtual spatial locations, the one or more virtual spatial locations being a projection of real spatial public locations, as spots in one of the main arenas; providing one or more pieces of information on the spots belonging to the main arena from information on a location of the mobile terminal to the mobile terminal; and selecting one of the spots and providing a list of posts related to the selected spot.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
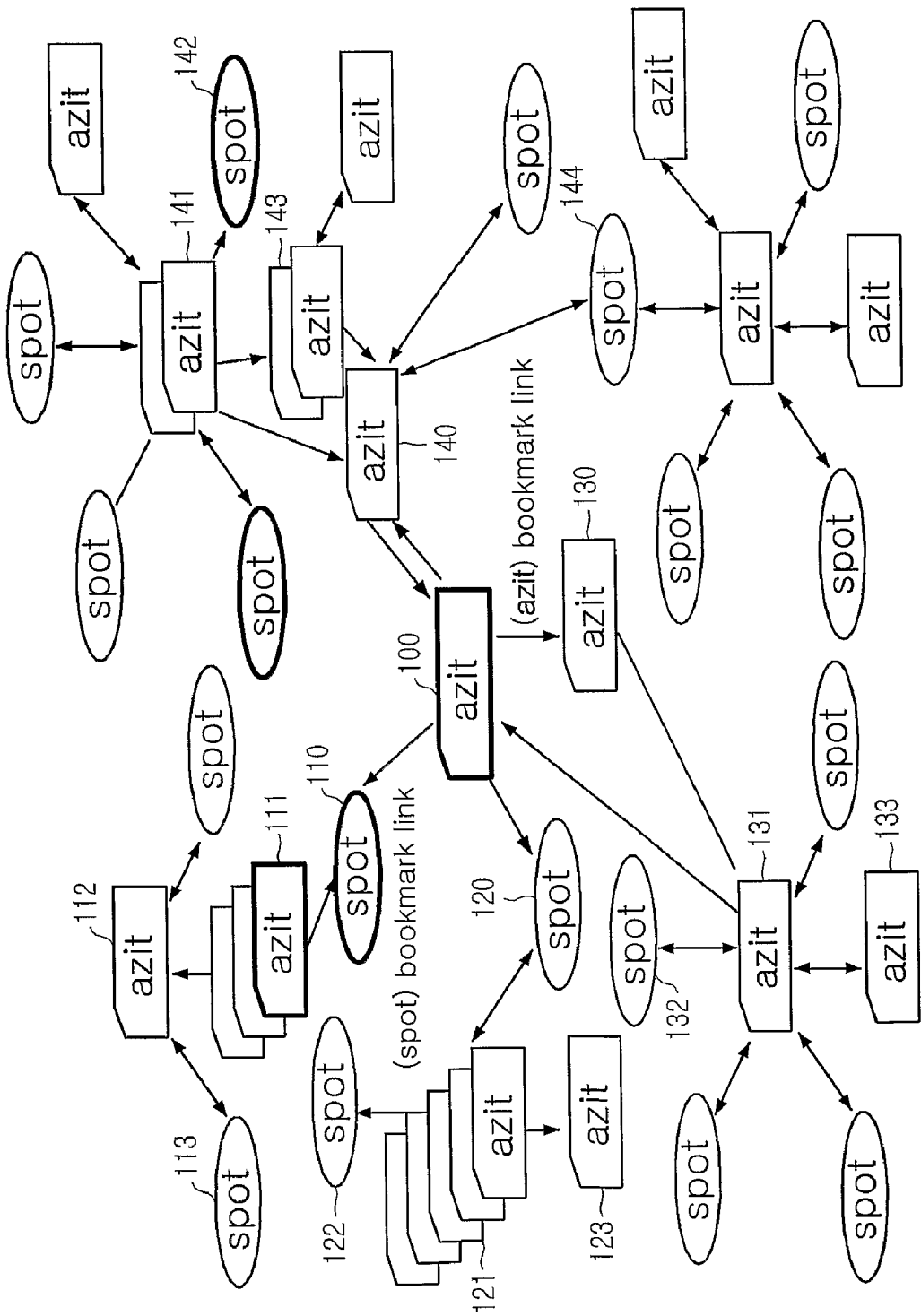
FIG. 1 is a main arena conceptual diagram illustrating conceptually a human network as a user's activity basis according to the present invention.

Hereinafter, preferred embodiments of the present invention will be described in detail with reference to the accompanying drawings. The following preferred embodiments are intended not to limit the scope of the present invention, but rather to provide a sufficient understanding of the present invention to those skilled in the art. Throughout the drawings, like reference numerals denote like elements.

The present invention suggests a novel method of introducing a concept of 'location' in an existing moblog service provided to record contents such as writing, photographs and the like in a blog on a web in real time using a mobile terminal and establishing communities between users by the medium of the location.

On the other hand, an essential concept of the present invention is in projecting an actual spatial location on a virtual spatial location. That is, an actual spatial location is mapped to a virtual spatial location in which information can be shared between users to allow them to bulletin the information or leave their remembrance and photographs that have been attained in the actual location. In addition, the present invention provides a free bulletin space where a variety of information and evaluation on a relevant location can be posted. Such an activity allows communities based on the location between users to be naturally established and facilitate meeting of the users on an actual off-line.

In addition, the present invention can perform a propensity evaluation on locations in a virtual space for each user and allow other users to search and visit their favorite locations. That is, various locations arousing relevant users proximity can be easily recommended or searched by setting a degree of proximity to each location for each user. Accordingly, locations frequently visited by users interested in particular issues (that is, other users having the same interest as a relevant user) in the virtual spatial location mapped to the actual spatial location can be recommended to the relevant user. In addition, information posted by users while the users visit a variety of locations can be apparently displayed and provided to the users through the user's terminal.

Hereinafter, several terms to be introduced to implement the present invention will be first defined.

The term 'main arena' as used herein is defined as a regional unit in an actual space divided according to the applicant of the present invention. The unit of the main arena may be expanded and divided in various forms of administrative units such as city, country, district, town, township, village or the like. For example, the unit of the main arena may have names of administrative districts such as Kangnam subway station, Apkoogung subway station, Jongro subway station and the like. The main arena is based on an actual location at which a user is currently located, and may be automatically set by detecting the user's location when the user moves to be within an area of a particular main arena.

The term 'spot' as used herein is defined as a virtual spatial location on which a particular location (or public place) in an actual space is projected. For example, the spot may be a virtual spatial location having the same name as an actual spatial location such as a Rodeo street, Apkoojung Dong Hyundae department store, Yeoksam Dong Renaissance hotel or the like. In this case, one or more spots exist within a main arena to which a user belongs, the main arena can be automatically set according to information on current location of the user, and the user can select one of spots belonging to the main arena and participate in the selected spot.

The term 'azit' as used herein is defined as a virtual spatial location on which a home in an actual space is projected. That is, the azit is a human (friends and neighbors) formation space possessed by an individual and has a concept of an individual homepage. The term 'post' as used herein is defined as the unit of information, such as a user's concerns, photographs, writing and the like, recorded in the spot or the azit. An operation of recording the information in the spot or the azit is called 'posting'.

In addition, the term 'note (message)' is defined as a notification or announcement service of informing friends or neighbors of a post prepared directly by a relevant user or posts prepared by other users. Such a note may be expanded to a short message service (SMS) or a multimedia message service (MMS).

On the other hand, the term 'link' as used herein is defined as a connection (for example, bookmark from an azit to a particular spot) of a user's human relationship (for example, a relationship between azits) to a user's concern (for example, spots). In this case, the user's human relationship may be managed to be divided into a friend relationship and a neighbor relationship.

Hereinafter, a link formation relationship through spots, azits and the like in the main arena defined in the present invention will be described with reference to FIGS. 1 and 2.

FIG. 1 is a main arena conceptual diagram illustrating conceptually a human network as a user's activity basis according to the present invention. Referring to FIG. 1, one or more spots 110 and 120 and friend (or neighbor)'s azits 130 and 140 are linked to a particular user's azit (that is, my azit) 100.

Specifically, it can be seen from the figure that two spots 110 and 120 are linked to my azit 100. The spots 110 and 120 can be linked by bookmarking a relevant spot. On the other hand, bold spots 110, 142 and 144 or bold azits 100 and 111 shown in the figure or bold azits 100 and 111 mean a level for the spots and azits.

In addition, each of the spots can be linked to other azits. For example, the spot 110 can be linked to the azit 111 and the spot 120 can be linked to the azit 121. Bold links shown the figure mean strength of link indicating a degree of interest in a relevant spot or azit and a degree of activity.

In addition, two azits 130 and 140 are linked to my azit 100. As described above, the azit 130 becomes a neighbor azit linked simply when my azit 100 bookmarks and the azit 140 becomes a friend azit linked when my azit 100 requests the azit 140 to make friends and the azit 140 agrees to do so.

On the other hand, another azit 131 linked to the azit 130 can be one-sidedly linked to my azit 100. Of course, this azit 131 can be linked to one or more spots 132 and azits 133.

Likewise, the friend azit 140 linked to my azit 100 with a friend relationship can be linked to one or more azits 143 and spots 144, and the azit 143 linked to the friend azit 140 can be also linked to another azit 141 linked to one or more spots 142 and azits.

Figure 2:
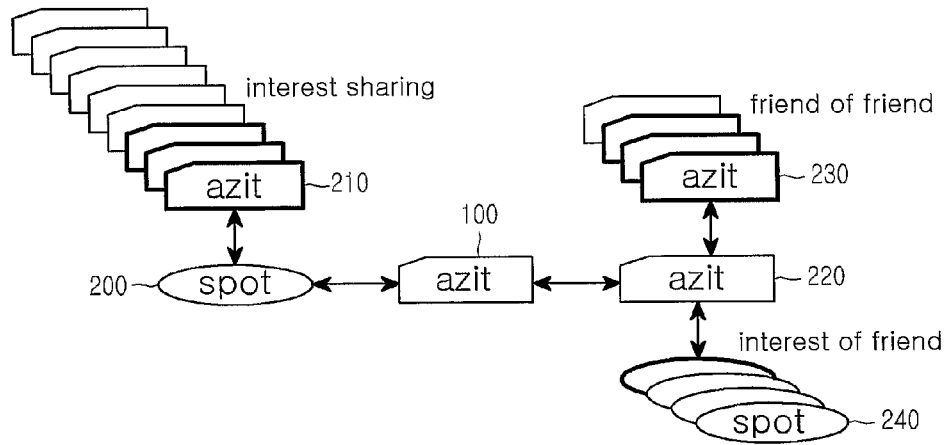
FIG. 2 is a link conceptual diagram illustrating a relationship between particular spots centered on an azit of a user and friends according to the present invention.

FIG. 2 is a link conceptual diagram illustrating a relationship between particular spots centered on an azit of a user and friends according to the present invention.

Referring to FIG. 2, as shown in FIG. 1, a spot 200 or a buddy azit 220 can be linked to my azit 100, and one or more spots 240 and azits 210 and 230 can be linked to the spot 200 and the buddy azit 220.

In this case, the spot linked to my azit 100 is a spot for a point in which the user is interested, and the azit 210 linked to the spot 200 linked to the my azit 100 can be assumed to have the same interest as my azit 100. Accordingly, when a number of azits 100 and 210 linked to the spot 200 register writing in the spot 200 or read writing from the spot 200, various interests related to the spot 200 can be shared. For example, assuming that a main arena of a user is 'Kangnam subway station' and a spot of 'City theater' is linked, when a number of users of spots linked to the spot of City theater register writing related to the location (for example, information related to movies or events) in the spot of City theater or read writing from the spot, various interests related to the relevant spot (i.e., a location as the same target) can be shared.

On the other hand, the present invention can perform a propensity evaluation on each of the spots for each user and allow other users to search and visit their favorite locations. That is, various locations arousing relevant users proximity can be easily recommended or searched by setting a degree of proximity to each spot for each user. Accordingly, spots frequently visited by persons having the same interest or propensity (for example, age, sex and the like) in virtual spatial locations, i.e., spots, mapped to actual spatial locations can be recommended to relevant users. In addition, information posted by users while the users visit a variety of spots can be apparently displayed and provided to the users through the user's terminal.

My azit 100 can form a human connection through the friend azit (i.e., the buddy azit) 220 as described above. That is, friend's interests and the like can be shared through spots 240 linked to the buddy azit 220, and, also, friend's friends can be known through azits 230 linked to the buddy azit 220. With such a link structure, a human relationship can be easily expanded through a virtual space according to a relevant user's interest.

On the other hand, the kind of the links as shown in FIG. 2 can be classified into the following three cases: first, an azit to azit link (human connection) including a link request and a link permission, second, an azit to spot link (URL (Uniform Resource Locator) bookmark) to specify a user's interest, and third, an azit to post link (URI (Uniform Resource Identifier) bookmark).

In addition, the present invention can effectively form a human network between users through the above-described link-based recommendation. The link-based recommendation can be classified into the following types: first, recommendation of new friends (azits) having a common interest post, second, recommendation of new friends (azits) based on a common interest location (spot), third, recommendation of other friends (azits) (i.e., friend's friends) in a human connection with a relevant friend (azit), fourth, recommendation of interest locations (spots) of friends (azits), and, fifth, recommendation of interest post of friends (azits).

So far, the used terms and the concept of the human connection formation and the link to interest fields in the present invention have been described. Now, a system for implementing the present invention will be described with reference to FIGS. 3 and 4.

Figure 3:
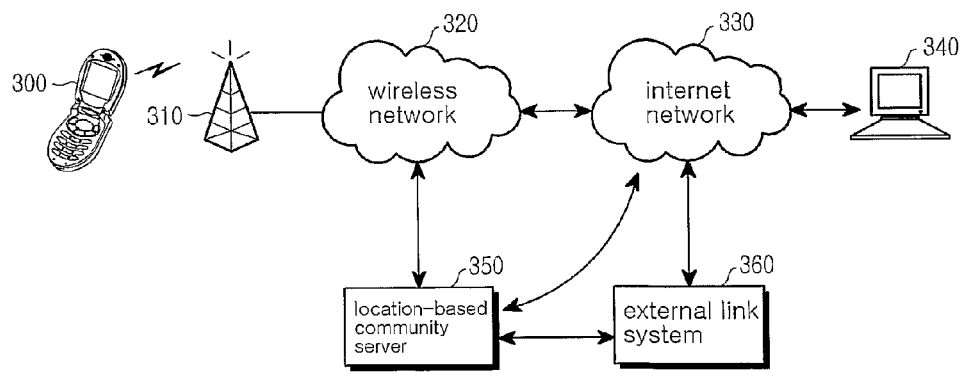
FIG. 3 is a diagram illustrating a moblog-based regional community service system using a mobile terminal according to the present invention.

FIG. 3 is a diagram illustrating a moblog-based regional community service system using a mobile terminal according to the present invention. Referring to FIG. 3, a moblog-based regional community service system includes a mobile terminal 300, a wireless network termination apparatus 310, a wireless network 320, an Internet network 330, a wired terminal 340, a location-based community server 350, and an external link system 360.

A moblog-based regional community service according to the present invention is provided to a user through his mobile terminal 300, and a location (i.e., a main arena) of the user carrying the mobile terminal 300 is detected through location information of the mobile terminal 300. The wireless network termination apparatus 310, including base stations and base station controllers, processes signals received from the mobile terminal 300 via any wireless environments and transmits the processed signals to wired/wireless networks. On the other hand, the wireless network 320 call-processes packet or circuit signals received from the mobile terminal 300 and transmits the call-processed signals to relevant terminals. Also, the wireless network 320 is linked to the Internet network 330 (i.e., a wired network) and the location-based community server 350.

That is, the wireless network 320 communicates with the Internet network 330 via a gateway or the like and is connected to the wired terminal 340 via the Internet network 330. In this case, it should be understood that the present invention can be practiced irrespective of the kind of the wireless network 320 (for example, an asynchronous network, a synchronous network, or 2G, 3G and 4G networks).

On the other hand, the location-based community server 350 includes information on the above-described various azits, spots and buddies and information on their respective links and posts and controls the information. The location-based community server 350 is connected to one or more mobile terminal 300 via the wireless network 320 and can be also connected to the wired terminal 340 and the like via the Internet network 330. In this case, for provision of the service of the present invention through the location-based community server 350, the wireless network 320 and the location-based community server 350 may be configured as an intelligent network such that the present invention can be implemented without changing the configuration of the wireless network 320.

In addition, the location-based community server 350 can provide services more effectively by being linked to various external link systems 360. For example, the location-based community server 350 can provide relevant services to users through a link to a short message system, an instant messenger system, an e-mail system and the like. Particularly, it is preferable that the location-based community server 350 is linked to different location-based systems so that the location-based community server 350 can provide location-based services to the users.

Hereinafter, the location-based community server 350 and the external link system 360 to be provided according to an embodiment of the present invention will be described in detail with reference to FIG. 4.

Figure 4:
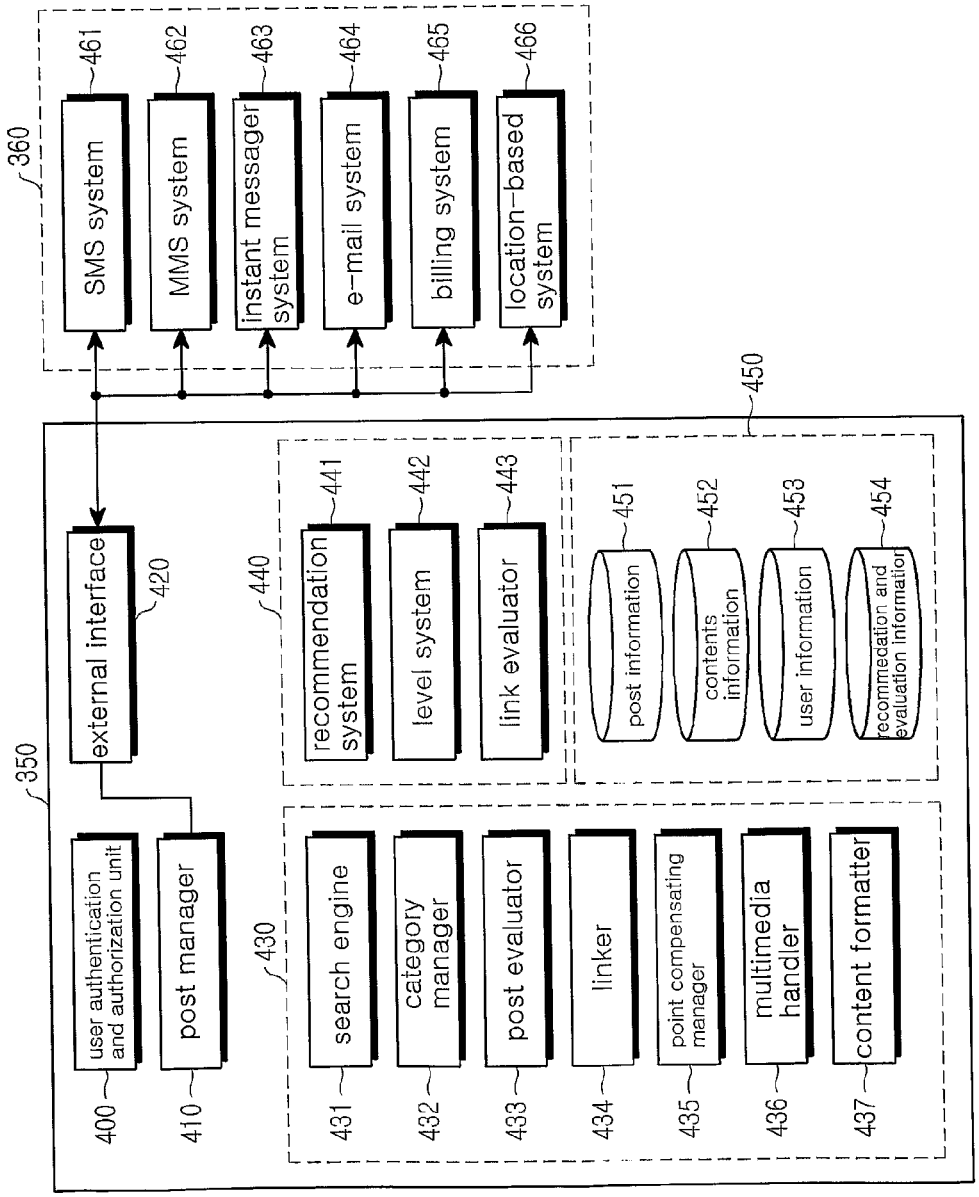
FIG. 4 is a diagram illustrating a detailed configuration of a location-based community server and an external link system according to an embodiment of the present invention.

FIG. 4 is a diagram illustrating a detailed configuration of the location-based community server and the external link system according to an embodiment of the present invention. Referring to FIG. 4, as shown in FIG. 3, the service according to an embodiment of the present invention is provided through a link between the location-based community server 350 and one or more external link systems 360.

The location-based community server 350 may include a user authentication and authorization unit 400, a post manager 410, an external interface 420, a service management module 430, a recommendation algorithm module 440, and a database unit 450.

The user authentication and authorization unit 400 performs a function of authentication and authorization for users.

The post manager 410 performs a function of input, correction, deletion, inquiry and photograph registration of posts as an information registration unit. The external interface 420 performs a function of interface for data exchange between the location-based community server 350 and the external link system 360 to be linked to the location-based community server 350.

The service management module 430 includes various functions required to carry out embodiments of the present invention. For example, the service management module 430 may include a search engine 431, a category manager 432, a post evaluator 433, a linker 434, a point compensating manager 435, a multimedia handler 436, a content formatter 437 and the like.

The search engine 431 performs a function of searching posts or azits using keywords inputted from users and outputting a search result. The category manager 432 performs a function of managing various categories provided according to the present invention. The post evaluator 433 performs a function of managing evaluation information on posts evaluated by other users. The linker 434 performs a function of managing a connection relationship between azits and posts, between azits and azits, and between azits and spots. The point compensating manager 435 performs a function of managing points provided according to use results of users and compensation given according to the points. The multimedia handler 436 performs a function of managing various multimedia information provided according to the present invention or registered by the users. The content formatter 437 performs a function of formatting the above-mentioned information in a prescribed format such that various information generated and provided by the performance of the present invention can be configured on a screen in such a manner adapted to wired/wireless environments.

On the other hand, the recommendation algorithm module 440 performs a function of executing a recommendation algorithm to recommend azits, spot, posts and the like to the users. For example, the recommendation algorithm module 440 may include a recommendation system 441, a level (rank) system 442, and a link evaluator 443.

The recommendation system 441 executes a recommendation algorithm to recommend azits, spots, friends or neighbors for each user. The level system 442 performs a function of setting and managing a level for each azit and spot according to a prescribed rule. The link evaluator 443 performs a function of evaluating each link and managing a result of the evaluation.

In addition, the location-based community server 350 may include the database unit 450 consisting of various databases. For example, the database unit 450 includes a post information database 451, a contents information database 452, a user information database 453, a recommendation and evaluation information database 454 and the like.

The post information database 451 includes information on posts, the contents information database 452 includes information on various contents provided according to the present invention, the user information database 453 includes information on user's personal affairs and user log-in, and the recommendation and evaluation information database 454 includes information on recommendation of azits, spots, posts and the like and level evaluation.

On the other hand, as described above, the location-based community server 350 is linked to the external link system 360 in order provide various service according to the present invention.

The external link system 360 may include a SMS system 461, a mms SYSTEM 462, an instant messenger system 463, an e-mail system 464, a billing system 465, a location-based system 466 and the like.

The SMS system 461 performs a function of transmitting short messages in a process of the present invention. The MMS system 462 performs a function of transmitting multimedia messages in a process of the present invention. In addition, the instant messenger system 463 performs a function of processing instant messages so that users can use an instant messenger function through wired/wireless terminals. The e-mail system 464 provides a function for e-mail transmission menus that can be used in a process of the present invention. The billing system 465 performs a function of billing users for service provided according to the present invention on a use amount basis or on a flat rate basis.

The location-based system 466 performs a function of providing information on each user's location in a process of the present invention. That is, the location-based system 466 detects information on a location of the mobile terminal 300 carried by each user and provides information on a main arena and the like to the user according to the present invention. On the other hand, how the location-based system 466 detects the information on the location of the mobile terminal 300 can be implemented in a various ways. For example, the location-based system 466 may use a global positioning system (GPS) or a cell ID search system using IDs of bases stations communicating with mobile terminals. Alternatively, the location-based system 466 may use a unique feature identifier (UFID) technique that can detect information on locations by the unit of building, may use a location acquisition method using an AP (Access Point).

So far, the configuration of the system according to the present invention has been described. Hereinafter, procedures of services performed by the present invention will be described.

First, services provided according to the present invention will be described with reference to FIGS. 5 and 6.

Figure 5:
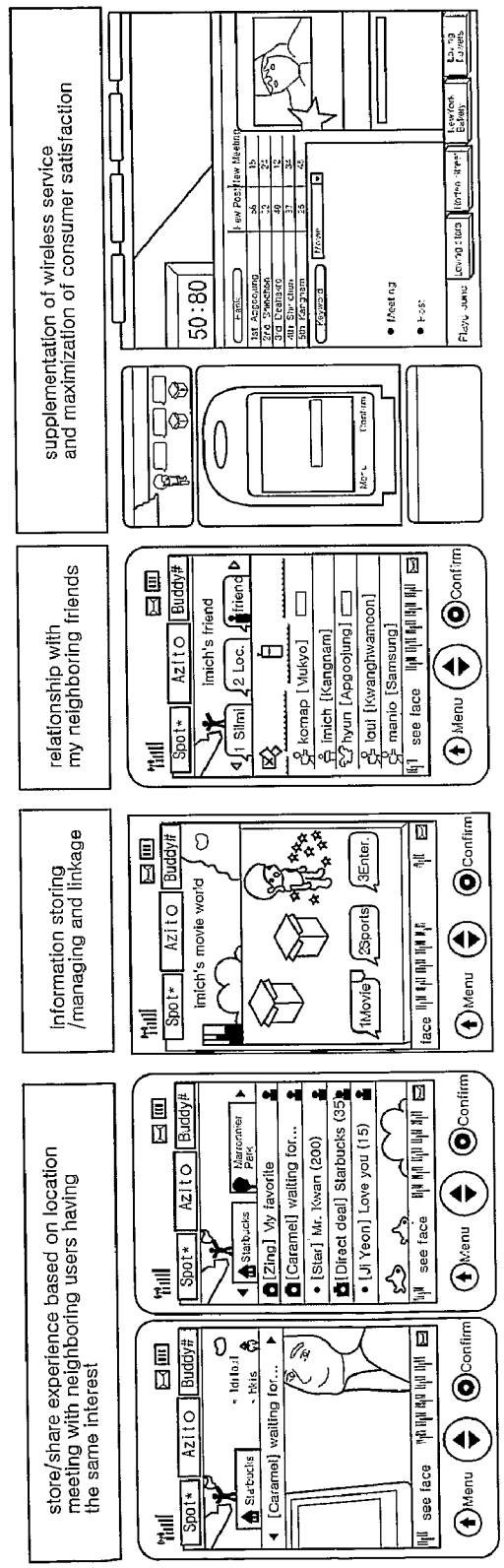
FIG. 5 is a diagram illustrating examples of a service enabled according to an embodiment of the present invention.

FIG. 5 is a diagram illustrating examples of a service enabled according to an embodiment of the present invention.

Referring to FIG. 5, service menus are provided through a mobile terminal according to an embodiment of the present invention. First, meeting of neighboring users having the same interest can be induced by storing and sharing location-based experience according to an embodiment of the present invention.

That is, as shown in a first menu of FIG. 5, a service user can store or share experience suffered by him at his location with other users in terms of photographs, moving pictures, writing or the like. At this time, it is preferable that the mobile terminal has a camera function in order to register the photographs or moving pictures. Accordingly, neighboring users having the same interest can share their experience by registering photographs taken at a current location along with sentences written in relation with the photographs.

In addition, as shown in a second menu of FIG. 5, different users at the same location can share their experience registered by the same method. That is, different users who register posts in their spots can share their experience suffered at the same location through photographs or writing related to the spots.

In addition, as shown in a third menu of FIG. 5, information registered by a relevant user can be stored, managed, and inquired with links to regional locations and azits of other users.

In addition, as shown in a fourth menu of FIG. 5, in the service according to the present invention, a relevant user can search information on users registered as his buddy friends. That is, the relevant user can know conditions and activities of neighboring ones of his friends and communicate in real time with the neighboring friends.

On the other hand, the location-based moblog service system according to the present invention can be linked to the wired network as shown in FIG. 3. Accordingly, a relevant user can manage his buddies or posts or decorate his azit by accessing the above-described location-based community server 350 according to the present invention through his computer terminal connected to the Internet.

Figure 6:
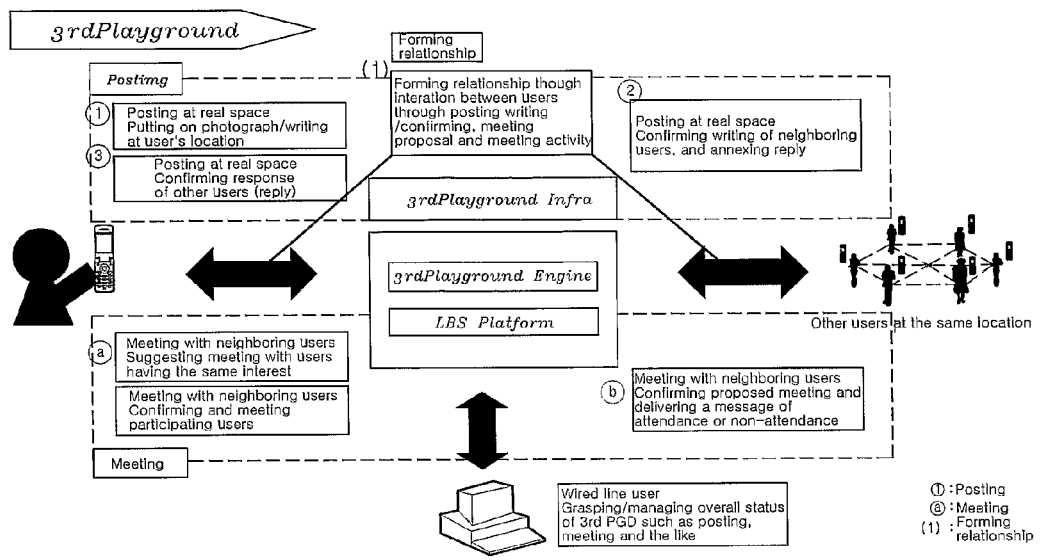
FIG. 6 is a conceptual diagram illustrating a flow of a service, which can be provided according to an embodiment of the present invention.

FIG. 6 is a conceptual diagram illustrating a flow of a service, which can be provided according to an embodiment of the present invention.

Referring to FIG. 6, according to an embodiment of the present invention, when a user registers photographs taken at a real space or writing or requests a meeting, other users in the same space and wired users can annex replies at the sight of the photographs and writing and notice the attendance or nonattendance at a meeting to thereby provide a real space meeting service.

From a viewpoint of posting in a real space, a user first registers photographs and writing at his location in the real space. At this time, other users near the user who registered the photographs and writing can annex replies at the sight of the posted photographs and writing. Then, the user who posted the photographs and writing can confirm response of other users through the number of replies or inquiries of other users. In addition, from a viewpoint of meeting inducement, a meeting is proposed to users having the same interest through the above-mentioned posting activity. At this time, other users near the user who registered the photographs and writing confirm a fact of the proposal of meeting and notice the attendance or nonattendance at the proposed meeting. Then, an off-line meeting between users who confirm the attendance or nonattendance at the meeting and notice the attendance at the meeting through above-mentioned procedures is established. On the other hand, from a viewpoint of relationship formation, a relationship through an interaction between users can be naturally formed through the above-described posting writing/confirmation, meeting proposal and meeting activity.

So far, the services provided according to the present invention have been described. Hereinafter, a detailed service provision procedure according to an embodiment of the present invention will be described with reference to FIG. 7.

Figure 7:
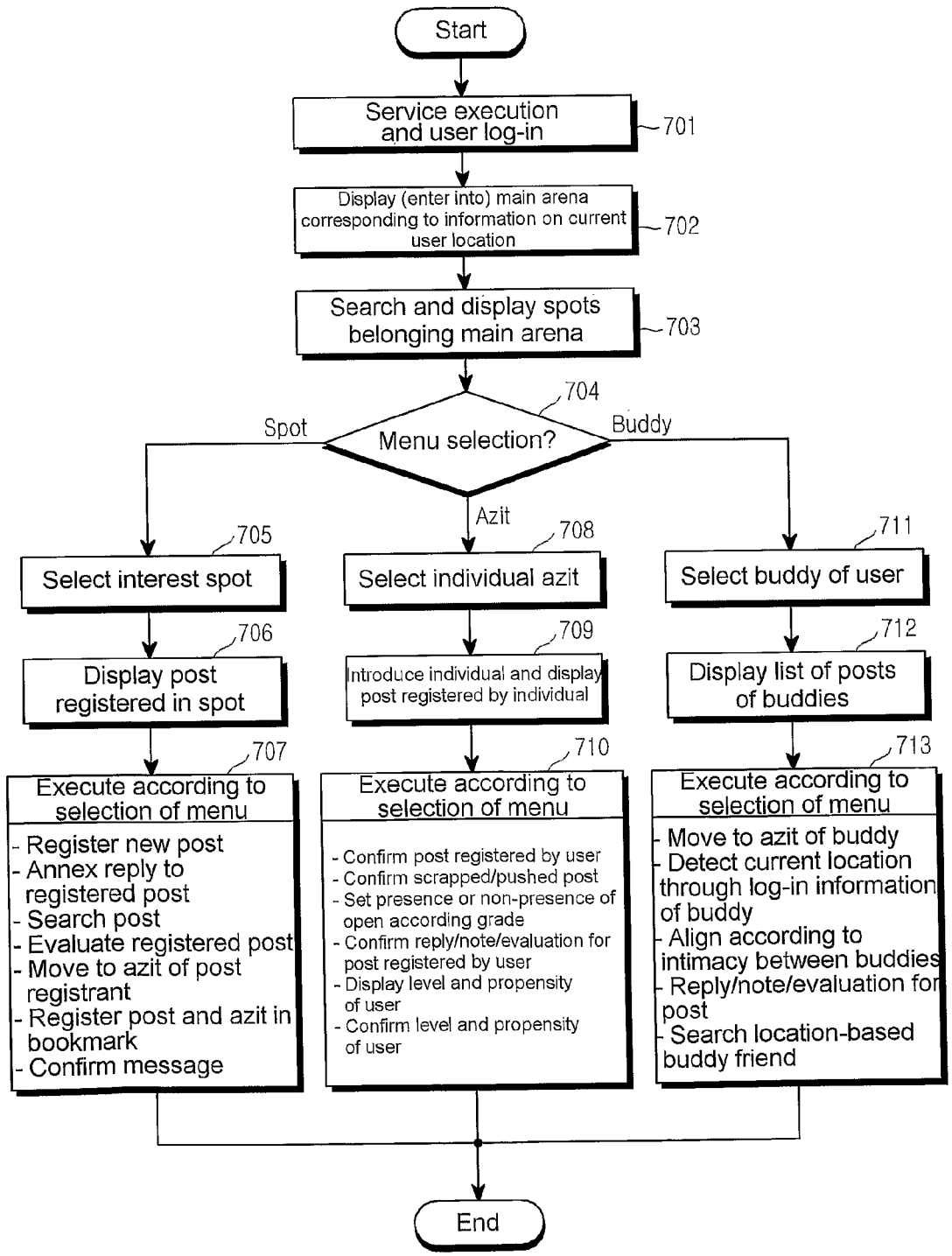
FIG. 7 is a flow chart illustrating a procedure of providing a moblog-based regional community service through a mobile terminal according to an embodiment of the present invention.

FIG. 7 is a flow chart illustrating a procedure of providing a moblog-based regional community service through a mobile terminal according to an embodiment of the present invention. Referring to FIG. 7, a user first executes a moblog-based regional community service and a user log-in through his mobile terminal (Step 701). At this time, a main arena corresponding to information on a current location of the user is displayed according to the location-based system (Step 702). That is, the user enters the main arena. The main arena may be displayed in various forms of administrative units such as city, country, district, town, township, village or the like. For example, the main arena may has names of administrative districts such as Kangnam subway station, Apkoogung, Myungdong, Jongro and the like. The main arena is based on an actual location at which the user is currently located, and may be automatically set by detecting the user's location when the user moves to be within an area of a particular main arena.

When the user logs in and enters the main arena, the location-based community server 350 searches spots belonging to the main arena and displays the searched spots on the mobile terminal of the user (Step 703). At this time, the user can receive a certain service by selecting one of spot, azit and buddy menus according to an embodiment of the present invention (Step 704).

First, when the user selects one of spots corresponding to the main arena from the spot menu (Step 705), a list of posts registered in the selected spot is displayed (Step 706). Then, by selecting one post from the displayed list of posts, writing or photographs for the selected post can be read or viewed. In addition, in the spot menu, a variety of works according to a provided additional selection menu can be performed (Step 707).

For example, a work of registering a new post or registering a reply in a registered post can be performed. In addition, a post search or an evaluation on a registered post can be performed. In addition, a user can move to an azit of a post registrant in a read post. Accordingly, other writing registered by the user who registers the post can be read. In addition, posts or azits of interest can be registered as a bookmark. As an additional function, a message box of a user can be confirmed.

On the other hand, when a user selects an individual azit menu (Step 708), the user can display only an introduction to him and posts registered by him (Step 709). That is, when the user registered the posts through various spots, the posts registered in the various spots can be collectively confirmed from the individual azit menu. In addition, in the individual azit menu, a variety of works can be performed according to a provided additional selection menu (Step 710). For example, the posts registered by the user or the posts scrapped or pushed by the user can be confirmed. In addition, the service can be implemented such that information on the user's personal affairs or writing or photographs registered by the user can be opened to only qualified users by setting whether or not the information, writing or photographs are be opened according to a grade. In addition, replies, notes or evaluation for a post registered by the user can be confirmed, or level or propensity of the user can be indicated or confirmed.

On the other hand, when the user selects the buddy menu (Step 711), a list of buddies linked to the user is displayed. When one of the buddies is selected, a list of posts registered by the selected buddy is displayed (Step 712).

In addition, in the buddy selection menu, a variety of works can be performed according to a provided additional selection menu (Step 713). For example, the user can move to an azit of the selected buddy or know a current location of the buddy through log-in information of the buddy. In addition, a degree of intimacy is granted among buddies and an alignment according to the degree of intimacy is possible. In addition, replies, notes or evaluation can be registered in posts registered by the buddies.

Hereinafter, service methods through the above-described spot, azit and buddy menus provided according to an embodiment of the present invention will be described with reference to FIGS. 8 to 13.

Figure 8:
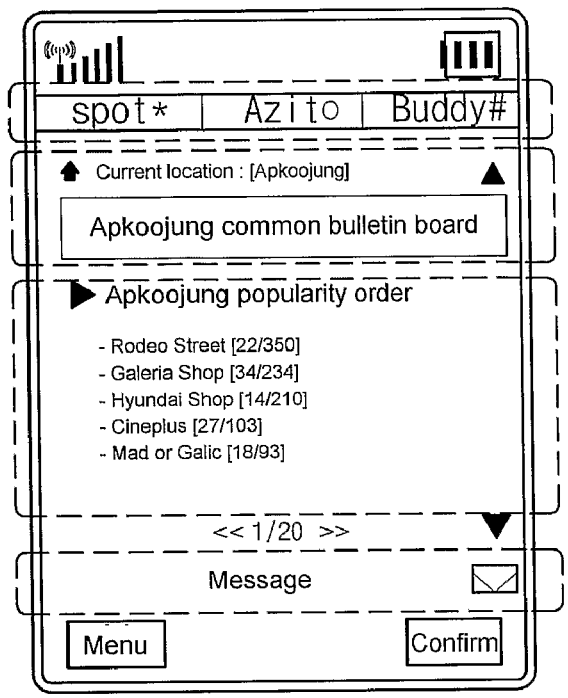
FIGS. 8 and 9 are diagrams illustrating a service method through a spot menu of a mobile terminal according to an embodiment of the present invention.
Figure 9:
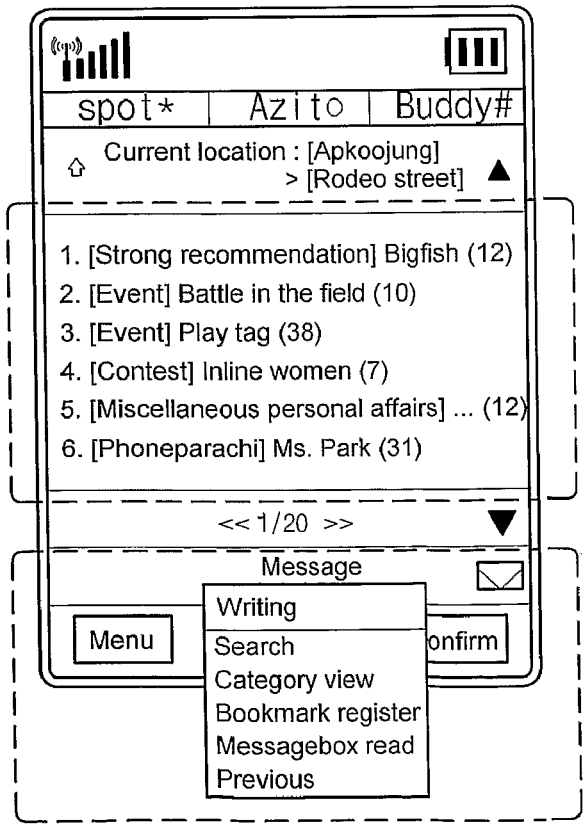

FIGS. 8 and 9 are diagrams illustrating a service method through the spot menu of a mobile terminal according to an embodiment of the present invention. Referring to FIG. 8, the spot menu is activated to provide a space where a relevant user and other users share their writing in a desired location (spot) or expand and deepen an interrelationship through a meeting among users having the same interest.

The spot means a point (for example, a Rodeo street) existing in a real location, as described above, and is a common theme space that users make together. Accordingly, the spot allows formation of a bulletin board in the unit of theme as a public location. A main arena, that is, a current location, is indicated as 'Apkoojung' in the spot menu. The current location is provided by detecting a position of a mobile terminal carried by the user using the location-based system (LBS). That is, the main arena means urban main centers and sub centers according to the location-based system. A common bulletin board is a place where events and announcement is viewed in the spot.

On the other hand, when the user enters the main arena as described above, a list of spots included in the main arena is displayed according to a prescribed order (for example, a popularity order). Here, by highlighting a certain spot in the list of spots, it can be seen that there is a link to a spot of. In addition, a message box function is added in the bottom of the spot menu to read notes provided to the user or confirm posts and meeting announcement registered by his friends.

When one spot (for example, a Rodeo street) in the list of spots is selected, a list of posts registered in the selected spot is displayed as shown in FIG. 8. Referring to FIG. 9, a list of posts registered in the selected spot, that is, the Rodeo street, is displayed. The list of posts is a bulletin posted by users in the selected spot. The users can post a variety of subjects including miscellaneous personal affairs, remembrance leaving, announcement of events and meetings hold by a region and a store and the like in this bulletin. After selecting one post in the list of posts, the selected post can be read and evaluated, or replies can be registered in the selected post. Thus, interchange of information between a post registrant and other users is possible and other users can be induced to an azit of a post maker through the post. On the other hand, by highlighting a certain post in the list of posts, it can be seen that the highlighted post is a post registered by the user's buddy.

Figure 10:
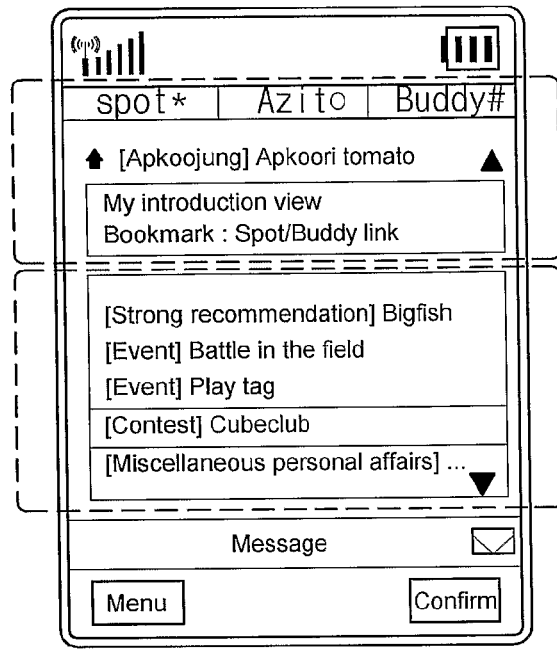
FIGS. 10 and 11 are diagrams illustrating a service method through an azit menu of a mobile terminal according to an embodiment of the present invention.
Figure 11:
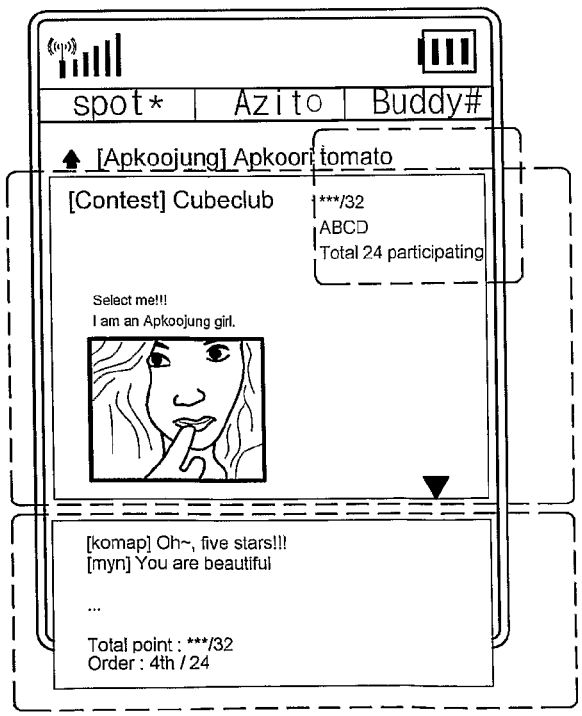

FIGS. 10 and 11 are diagrams illustrating a service method through an azit menu of a mobile terminal according to an embodiment of the present invention. Referring to FIG. 10, all information on an individual used to form a connection with other persons through the individual azit menu is stored, and a level, propensity and the like of the individual can be indicated. Thus, identity of the individual can be expressed, and an active posting activity in the spots can be induced by providing a link to other persons who do not make buddies.

The user space, that is, the azit, which is a user's residing space in the main arena, is a location at which the user can meet his friends in regions centered at the user and is his own space where the user can express and decorate him. A list of posts registered by the user and posts scrapped or pushed by the user are displayed on the azit menu. In addition, presence or non-presence of open for the posts can be set in such a manner that whether or not the posts are opened depends on a grade of relationship. On the other hand, when one post in the displayed list of posts is selected, contents of the selected post are displayed as shown in FIG. 11.

Referring to FIG. 11, the post may include writing and photographs used to advertise the user himself. That is, propensity of the user and tendency to the user's interest are expressed by individual posts successively registered in the user's azit. On the other hand, the posts registered in the spot shown in FIG. 8 are also registered in the azit menu simultaneously, as described above. Replies or evaluations registered by other users after other users read the posts are displayed on the bottom of the post menu. That is, other users read the posts of the relevant azit can annex replies, notes or evaluations to the posts. In addition, instant grouping and meeting can be induced. In addition, there may be provided a field of association and expression between users by sharing information, interest and meeting between the users through the post in the azit.

On the other hand, the post registered in the azit may be analyzed to indicate the level and propensity of the user. That is, the level and propensity of the user can be analyzed by analyzing and indexing an extent of experience, a relationship index, evaluation items and the like of the user using a system.

Figure 12:
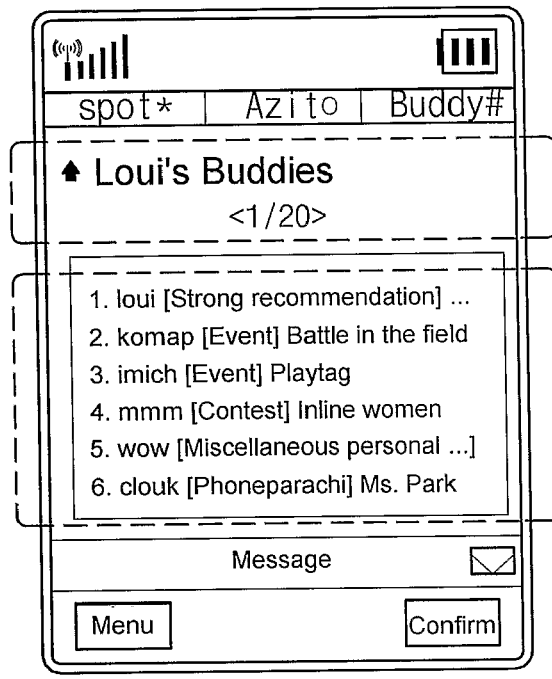
FIGS. 12 and 13 are diagrams illustrating a service method through a buddy menu of a mobile terminal according to an embodiment of the present invention.
Figure 13:
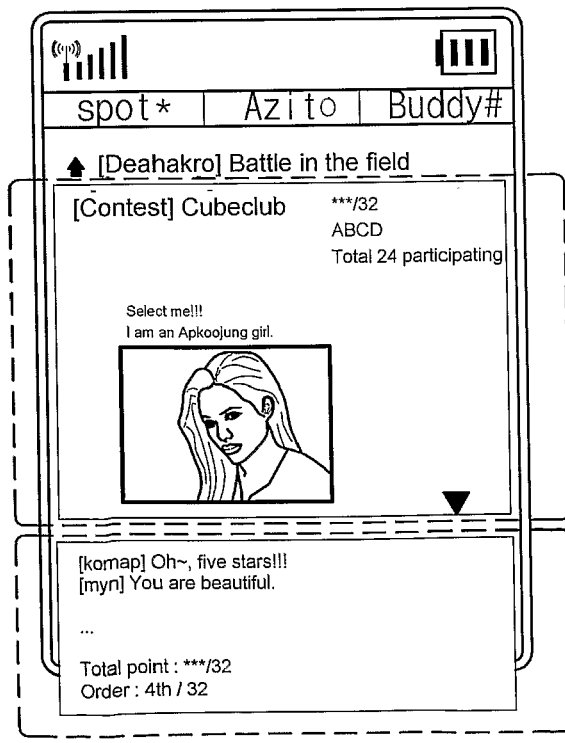

FIGS. 12 and 13 are diagrams illustrating a service method through a buddy menu of a mobile terminal according to an embodiment of the present invention. Referring to FIG. 12, buddies associated with the user are stored and managed through the buddy menu, and an interrelationship between the user and the buddies can be deeply developed by recognizing conditions of activity (for example, presence information, individual posts registered by the buddies, azits of the buddies and the like) of the buddies (human connections) at the user's location.

The buddy menu is a space shared with the user's friends and also a post space of acquaintances formed according to the user's human connection. Accordingly, new posts of the buddies are listed and shown, and a link allowing a direct movement to azits of the buddies can be provided. In addition, immediacy through a real time alarm can be provided.

On the other hand, a list of posts provided in the buddy menu includes posts registered by the user's buddies. The user can know current activities and conditions of buddies who registered the posts through the registered posts. In addition, the posts are aligned according to a degree of intimacy among the buddies. At this time, when one post in the list of posts is selected, the buddy menu is changed to an azit menu, as shown in FIG. 13, where contents of a relevant post are displayed in the form of a text or an image.

Referring to FIG. 13, the displayed contents of the post may be configured as writing and photographs to advertise a relevant buddy. That is, propensity of the buddy and tendency to the buddy's interest are expressed by individual posts registered by the buddy. Replies or evaluations registered by other users after other users read the posts are displayed on the bottom of the post menu. That is, other users who read the posts of the buddy can annex replies, notes or evaluations to the posts. In addition, instant grouping and meeting can be induced. In addition, there may be provided a field of association and expression between users by sharing information, interest and meeting between the users through the posts in the buddy.

Figure 14:
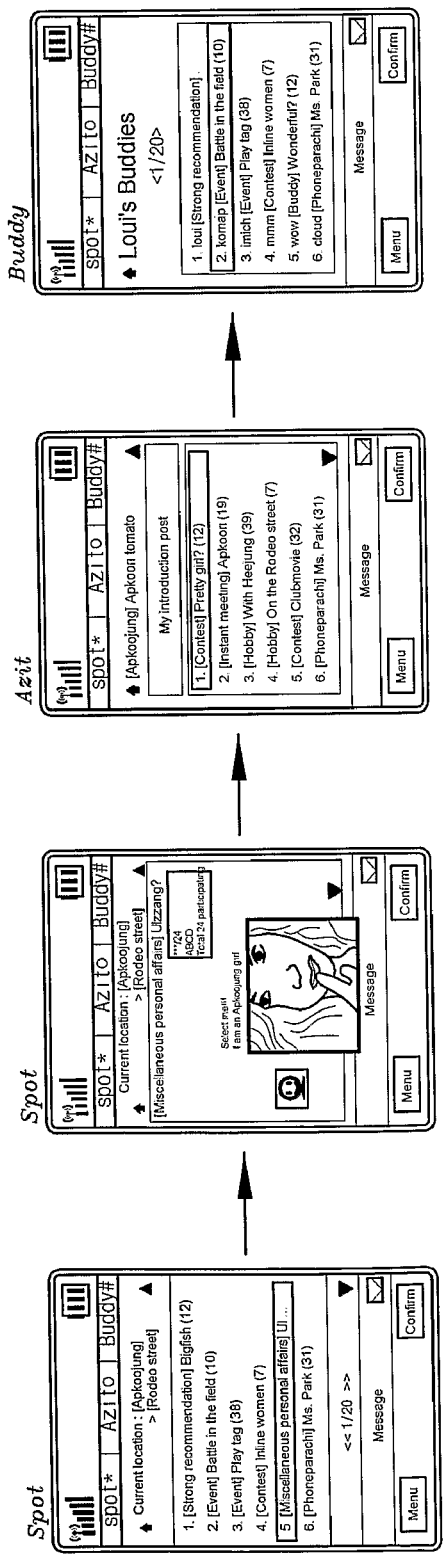
FIG. 14 is a diagram illustrating a service link procedure through spot, azit and buddy menus according to an embodiment of the present invention.

FIG. 14 is a diagram illustrating a service link procedure through spot, azit and buddy menus according to an embodiment of the present invention. Referring to FIG. 14, as shown in FIGS. 8 to 10, a basic blogging is conducted in the spot, the azit of the user is filled through the blogging, and a relationship structure where buddies are formed through the azit is formed. Accordingly, spot, azit and buddy service modules are interconnected organically, not separately, forming an entire communication flow of the services.

For example, a user A locating at Apkoojung enters into a spot [Rodeo street] of spots taking the Apkoojung as a main arena. When the user A selects the spot, a list of posts registered in the spot is displayed. The user selects one post in the list of posts in a first spot menu. For example, No. 5. '[miscellaneous personal affairs] ulzzang?' ('ulzzang' means a good face) registered by a user B is selected. According to the selection, contents of the selected post is displayed in a second spot menu. That is, the user A reads the post registered in the spot by the user B, taking an interest in the user B. Then, when the user A selects '[Azit viewing]' of the user B who registered the post in contents of the post, a third azit menu is provided.

A selected azit of the user B is displayed in the third azit menu. That is, the user A visits the azit of the user B through the post registered in the [Rodeo street] spot by the user B and gets acquainted with the user B by reading a post registered in Apkoogung by the user B. Then, the user A requests the user B to provide a buddy.

When the user B accepts the request for the buddy from the user A, the users A and B form a new interrelationship, i.e., a buddy relationship. Accordingly, new writing registered in Apkoojung by the buddy can be read, and varying situation of the buddy can be confirmed in real time.

Figure 15:
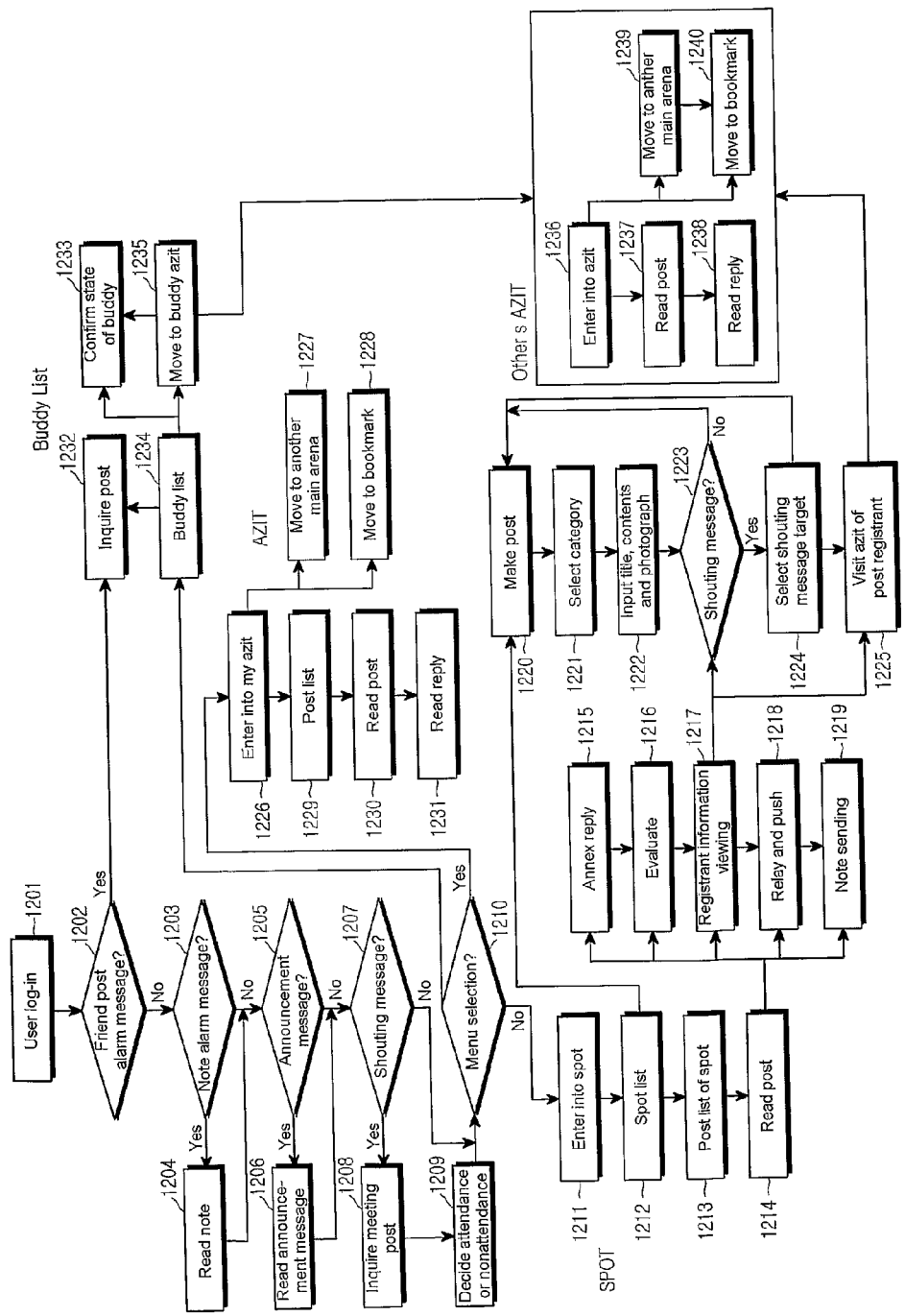
FIG. 15 is a diagram illustrating an entire service flow through a menu provided through a mobile terminal according to an embodiment of the present invention.

FIG. 15 is a diagram illustrating an entire service flow through a menu provided through a mobile terminal according to an embodiment of the present invention. Referring to FIG. 15, when a user logs-in (Step 1201) and a friend post alarm message appears (Step 1202), a control flow moves a relevant buddy list in order to inquire posts (Step 1232). In addition, when a note alarm message appears (Step 1203), the note is read (Step 1204), and when an announcement message appears (Step 1205), the announcement is read (Step 1206). If a shouting message appears (Step 1207), a post informing a meeting is inquired (Step 1208) and then the attendance or nonattendance is decided (Step 1209).

On the other hand, when the user selects a menu (Step 1210) and enters into a spot menu (Step 1211), a list of spots is displayed (Step 1212). When the user selects a particular spot in the list of spots, a list of posts of the selected spot is displayed (Step 1213). When a particular post in the list of posts is selected, the selected post is displayed (Step 1214). Functions of reply annexation (Step 1215), evaluation (Step 1216), post registrant information viewing (Step 1217), relay and push (Step 1218), note sending (Step 1219) and the like can be performed in the selected post.

Here, when the user selects the post registrant information viewing (Step 1217), he visits an azit of the post registrant (Step 1225) and enters into the azit of the post registrant (Step 1236) in order to confirm the post (Step 1237) and register a reply (Step 1238). On the other hand, when the user selects a menu (Step 1210) and enters into an azit menu (Step 1226), a list of spots registered in an azit of the user is displayed (Step 1229). When the user selects and reads a particular post in the list of posts (Step 1230) and confirms registered replies (Step 1231). On the other hand, the user can move from the azit to another main arena (Step 1227) or move from the azit to another azit or spot through a bookmark menu (Step 1228).

When the user selects a menu (Step 1210) and enters into a buddy menu, a list of buddies of the user is provided (Step 1234) and state information of each buddy is displayed (Step 1233). In the buddy menu, the user can inquire posts registered by the buddies (Step 1232) or move to an azit of a relevant buddy (Step 1235). When the user selects movement to the azit of the buddy (Step 1235), he enters into the azit of the buddy (Step 1236) in order to confirm the posts registered by the buddy (Step 1237) and register a reply (Step 1238). In addition, the user can move from the azit of the buddy to another main arena (Step 1239) or move from the azit of the buddy to another azit or spot through a bookmark menu (Step 1240).

Figure 16:
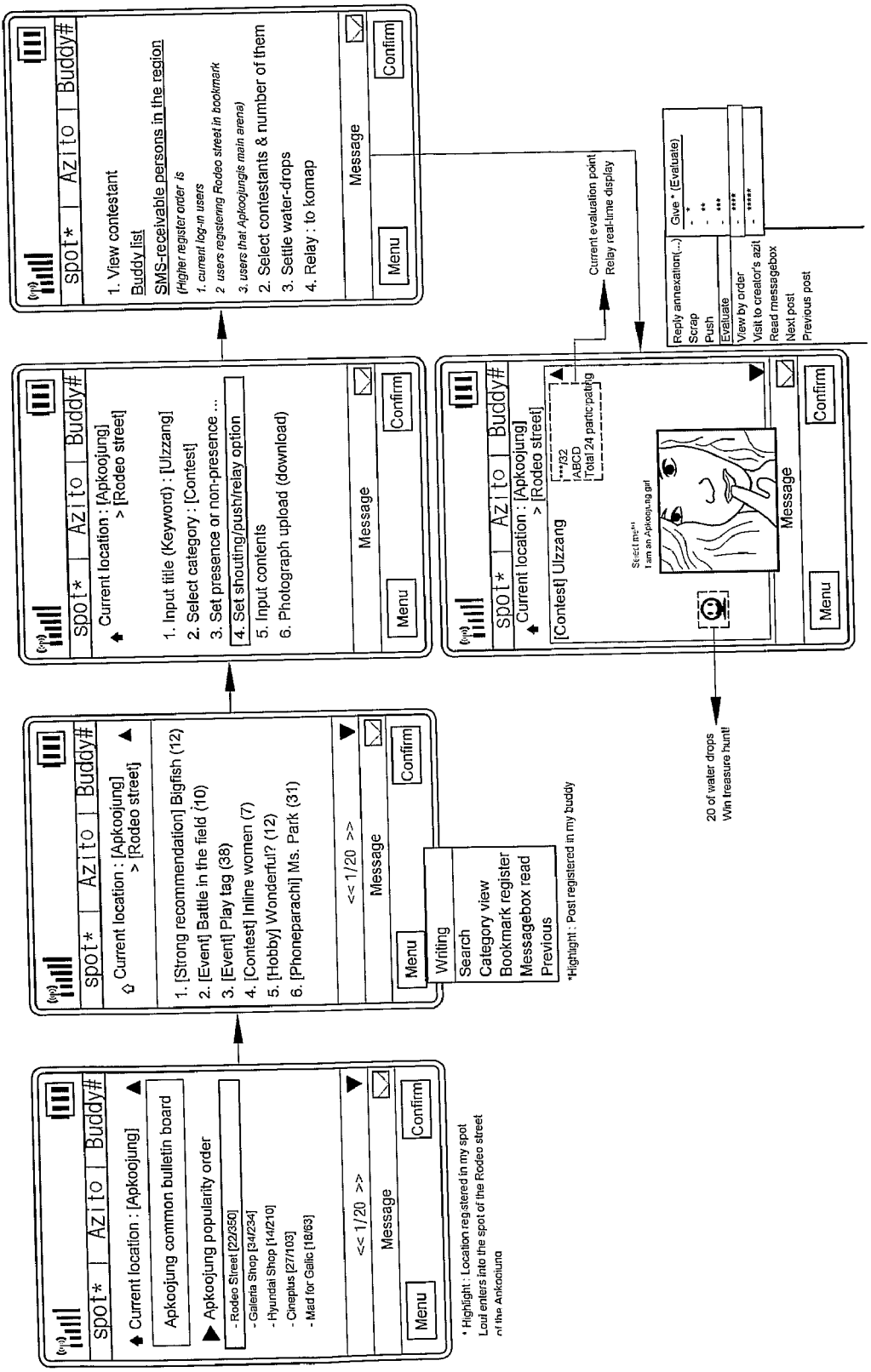
FIG. 16 is a diagram illustrating an execution procedure in a spot menu of a mobile terminal in a moblog-based regional community service according to an embodiment of the present invention.

FIG. 16 is a diagram illustrating an execution procedure in a spot menu of a mobile terminal in a moblog-based regional community service according to an embodiment of the present invention. Referring to FIG. 16, when a user locates at Apkoojung as mentioned above, spots for a relevant main arena are displayed according to a popularity order. When the user enters into the Rodeo street spot in the list of spots, the list of posts registered for the Rodeo street is provided. Writing, search, bookmark, message box reading and the like can be performed through a separate menu in the list of posts.

Here, when the writing is selected, according to a writing menu, a title (keyword) is inputted, a category is selected, and presence or non-presence of open is set. In addition, a shouting/push/relay option is set, contents are inputted, and photographs are put on. Here, when the shouting menu is selected, a list of buddies or a list of SMS-receivable persons in the region is confirmed, and relevant contents can be shouted/pushed/relayed. When a '[contest] ulzzang' menu is selected from the list of posts of the spot, writing and photographs registered by contestants are displayed, and menus such as reply annexation (notes/SMS), scrapping, pushing, evaluation, viewing by order, visit to creator's azit, message box read, next post, previous post and the like can be performed.

Figure 17:
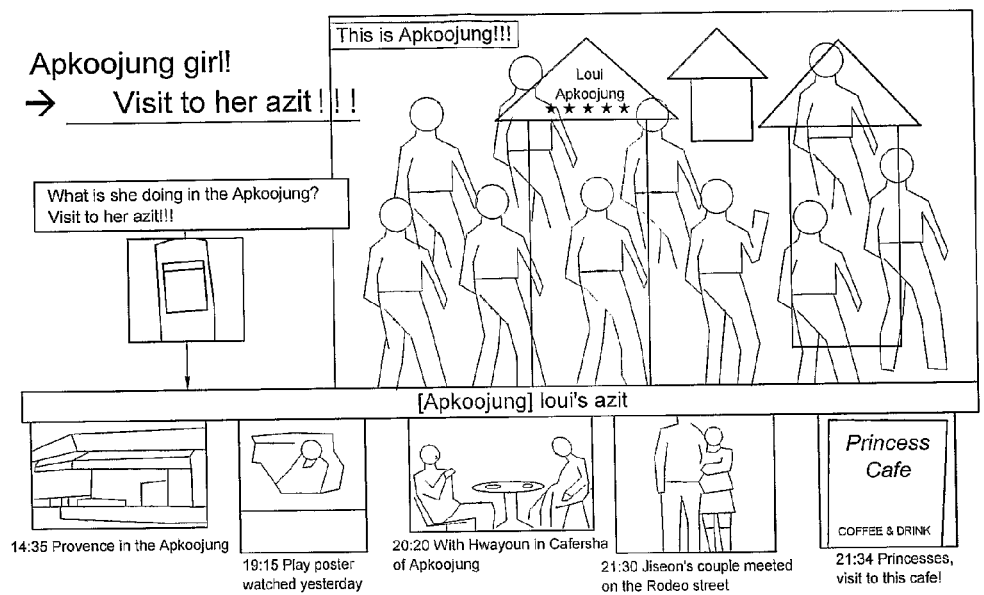
FIG. 17 is a diagram illustrating a service use condition using an azit function in a moblog-based regional community service according to an embodiment of the present invention.

FIG. 17 is a diagram illustrating a service use condition using an azit function in a moblog-based regional community service according to an embodiment of the present invention. Referring to FIG. 17, at the sight of the '[contest] ulzzang' post shown in FIG. 16, the user is interested in the contestants and may move to azits of the contestants.

The user may confirm posts registered in the azits of the contestants, and accordingly, interest fields and experiences of the contestants may be shared by other users through the posts registered by the contestants. In addition, the users may directly visit or experience locations visited by the contestants.

On the other hand, the above-described service of the present invention may be provided in conjunction with other services, which can be provided through mobile terminals. For example, in communications between the mobile terminals, it is possible to implement a service of locating users and communicating between the users using an Ad-hoc networking system employing a wireless communication technique such as wireless LAN or Bluetooth. In addition, in communications between the mobile terminals, it is possible to implement a service of communicating between neighboring users in a broadcast manner using a push-to-talk (PTT) system. In addition, it is possible to implement a service of locating moving users, supporting communications between the moving users, and distributing a mass of information such as multimedia information using a high-speed portable Internet (HPI) system such as a WiBro (wireless broadband Internet) system for mobile terminals.

As apparent from the above description, according to the present invention, a concept of 'location' is introduced in a moblog and communities between users can be formed by the medium of the location. On the basis of such communities, a real off-line meeting as well as an on-line meeting is induced to thereby expand a human network.

Furthermore, the present invention has advantages of utilization of a variety of services including location-based remembrance leaving, location bulletin board, location (store) advertisement, evaluation on locations, regional event announcement, participation in regional contests, location-based meeting announcement and the like.

While the present invention has been particularly shown and described with reference to exemplary embodiments thereof, it will be understood by those skilled in the art that various changes in form and details may be made therein without departing from the spirit and scope of the present invention as defined by the appended claims and equivalents thereof.

What is claimed is:

1. A system for providing a moblog-based regional community service through a mobile terminal, comprising:

a location-based community server comprising a CPU and memory for setting a plurality of main arenas by dividing a geographical area into a plurality of regional units, setting and storing one or more virtual spatial locations, the one or more virtual spatial locations being a projection of real spatial public locations, as spots in one of the main arenas, selecting a main arena based on information on a location of the mobile terminal, providing information on one or more of the spots belonging to the selected main arena to the mobile terminal, receiving post information to be registered in the one or more of the spots belonging to the main arena through the mobile terminal, and storing the received information on posts with a link with the spots, wherein the location-based community server selects a current main arena of the mobile terminal, such that a particular one of the main arenas is automatically selected as the current main arena when an actual location of the mobile terminal is detected to be within a particular one of the regional units, provides a list of selectable spots belonging to the current main arena to the mobile terminal, the selectable spots in the list respectively having the same name as a real spatial public location within the particular regional unit for the current main arena, receives a selection input from the mobile terminal, which selects one of the selectable spots, and provides a list of post related to the selected spot;

wherein the location-based community server includes a service management module for establishing a link between the posts and the spots; and the service management module further includes:

a search engine for performing a function of searching the azits storing the posts or personal information using keywords inputted from users and outputting a search result;

a linker for performing a function of managing at least one of connection relationships between azits and posts, between azits and azits, and between azits and spots; and a content formatter for performing a function of formatting various information in a prescribed format such that the various information can be configured on a screen in such a manner adapted to wired/wireless environments.

2. The system according to claim 1, wherein the location-based community server further includes:

a user authentication and authorization unit for performing a function of authentication and authorization for users;

a post manager for performing a function of managing at least one of input, correction, deletion, inquiry and photograph registration of posts as an information registration unit;

an external interface for performing a function of interface for data exchange with the external; and a database unit for storing various information required to provide the service.

3. The system according to claim 1, further comprising:

at least one external link system provided at the external of the location-based community server for enhancing a function of the moblog-based regional community service, wherein the external link system includes at least one of a short message service system, a multimedia message system, an instant message system, an e-mail system, a billing system, and a location-based system.

4. The system according to claim 3, wherein, when the location-based system is included, the location-based system confirms a location of the mobile terminal according to a prescribed method and provides information on the location of the mobile terminal to the location-based community server.

5. The system according to claim 4, wherein the information on the location of the mobile terminal is acquired according to one of a location acquisition method using a GPS system, a location acquisition method using base station cell IDs, a location acquisition method using UFIDs, and a location acquisition method using an AP (Access Point).

6. The system according to claim 3, wherein the location-based system directly enters into at least one of a main arena and the spots at which the mobile terminal is located, according to the information on the location of the mobile terminal.

7. The system according to claim 6, wherein the spots are identified according to a code granted for each location.

8. The system according to claim 1, wherein the post information include at least one of text, image and multimedia data.

9. A method for providing a moblog-based regional community service through a mobile terminal, the method comprising the steps of:

setting a plurality of main arenas by dividing a geographical area into a plurality of regional units and setting and storing one or more virtual spatial locations, the one or more virtual spatial locations being a projection of real spatial public locations, as spots in each of the main arenas;

selecting a current main arena of the mobile terminal, such that a particular one of the main arenas is automatically selected as the current main arena when an actual location of the mobile terminal is detected to be within a particular one of the regional units;

providing a list of selectable spots belonging to the current main arena to the mobile terminal, the selectable spots in the list respectively having the same name as a real spatial public location within the particular regional unit for the current main arena;

receiving a selection input from the mobile terminal, which selects one of the selectable spots; and providing a list of post related to the selected spot;

establishing a link between the posts and the spots by a service management module of a location-based community server; and the establishing step of the service management module further includes the steps of:

searching the azits storing the posts or personal information using keywords inputted from users and outputting a search result;

managing at least one of connection relationships between azits and posts, between azits and azits, and between azits and spots; and formatting various information in a prescribed format such that the various information can be configured on a screen in such a manner adapted to wired/wireless environments.

10. The method according to claim 9, further comprising the step of:

registering a post information related to the selected spot.

11. The method according to claim 10, further comprising the step of:

storing the registered information on the post and information on a link for a spot related to the post.

12. The method according to claim 10, wherein the post information include at least one of text, image and multimedia data.

13. The method according to claim 9, wherein the information on the location of the mobile terminal is acquired according to one of a location acquisition method using a GPS system, a location acquisition method using base station cell IDs, a location acquisition method using UFIDs, and a location acquisition method using an AP (Access Point).

14. The method according to claim 9, further comprising the steps of:
by each user, performing evaluation on propensity of each of the spots; and
providing a list of spots according to the evaluated propensity of each spot.

15. The system according to claim 4, wherein the information on the location of the mobile terminal is acquired according to one of a location acquisition method using base station cell IDs, a location acquisition method using UFIDs, and a location acquisition method using an AP (Access Point).

16. The method according to claim 9, wherein the information on the location of the mobile terminal is acquired according to one of a location acquisition method using base station cell IDs, a location acquisition method using UFIDs, and a location acquisition method using an AP (Access Point).

17. The system according to claim 1, wherein:
a main arena corresponding to a preset regional unit is preset in the location-based community server, and corresponding selectable spots in connection with said main arena are preset in the location-based community server, such that each of the corresponding selectable spots corresponds to a real spatial location within the preset regional unit; and then
the actual location of the mobile terminal is detected; and
when the actual location of the mobile terminal is detected to be within the preset regional unit, the location-based community server then controls a list of the corresponding selectable spots within the preset regional unit to be displayed on the mobile terminal, such that each of the corresponding selectable spots is displayed to have the same name as a real spatial location within the present regional unit.

18. The method according to claim 9, wherein:
a main arena corresponding to a preset regional unit is preset, and corresponding selectable spots in connection with said main arena are preset such that each of the corresponding selectable spots corresponds to a real spatial location within the preset regional unit; and then
the actual location of the mobile terminal is detected; and
when the actual location of the mobile terminal is detected to be within the preset regional unit, a list of the corresponding selectable spots within the preset regional unit is then displayed on the mobile terminal, such that each of the corresponding selectable spots is displayed to have the same name as a real spatial location within the present regional unit.

19. The system according to claim 1, wherein, when the actual location of the mobile terminal is detected to be within the particular regional unit, the location-based community server automatically provides the mobile terminal with said list of selectable spots within the particular regional unit to the mobile terminal.

* * * * *